3,393,245
OLIGOMERIZATION OF CONJUGATED DIENES
Ernest A. Zuech, Bartlesville, Okla., assignor to Phillips Petroleum Company, a corporation of Delaware
No Drawing. Continuation-in-part of application Ser. No. 500,226, Oct. 21, 1965. This application Apr. 11, 1966, Ser. No. 541,516
3 Claims. (Cl. 260—666)

ABSTRACT OF THE DISCLOSURE

Conjugated dienes are oligomerized or reacted with ethylene using a catalyst formed from a conjugated diene-organolithium adduct and a nickel compound, cobalt compound, or iron compound.

---

This application is a continuation-in-part of my copending application Ser. No. 500,226, filed Oct. 21, 1965, now abandoned.

This invention relates to a new and improved process for polymerizing conjugated dienes. In one aspect this invention relates to a new and improved catalyst for polymerizing conjugated dienes. Another aspect relates to a new and improved process for forming diolefins. Another aspect relates to a new and improved catalyst for forming diolefins.

Heretofore processes and catalysts have been proposed for making linear and cyclic dimers and trimers of conjugated dienes. However, these processes and catalysts have, in general, failed to yield substantial amounts of the desired dimers and/or trimers.

It has now been found that butadiene can be oligomerized to produce methylheptatriene in high yields by contacting butadiene under oligomerization conditions with a catalyst formed on mixing a butadiene-organolithium adduct with a cobalt compound. By oligomerization is meant the reaction and therefore polymerization of relatively few units of a polymerizable material. By oligomers is meant relatively low molecular weight polymerized materials. Dimers and trimers are typical oligomers.

The catalyst according to this aspect of the invention is that formed on mixing a butadiene-organolithium adduct, which itself is formed by reacting butadiene with an organolithium compound, and a cobalt compound.

It has also been found that a conjugated diene selected from the group consisting of butadiene, isoprene, and piperylene, can be oligomerized to produce cyclododecatrienes in high yields by contacting one of the above conjugated dienes under oligomerization conditions with a catalyst formed on mixing a conjugated diene-organolithium adduct with a nickel compound.

The catalyst for this aspect of the invention is that formed on mixing a conjugated diene-organolithium adduct, which itself is formed by reacting one of butadiene, isoprene, or piperylene with an organolithium compound, with a nickel compound.

It has also been found that at least one conjugated diene selected from the group consisting of butadiene, isoprene, and piperylene can be reacted with ethylene to form diolefins, by contacting ethylene and the above conjugated dienes under reaction conditions with a catalyst formed on mixing a conjugated diene-organolithium adduct with one of an iron compound, a nickel compound, and a cobalt compound.

The catalyst for this aspect of the invention is that formed on mixing a conjugated diene-organolithium adduct, which itself is formed by reacting one of butadiene, isoprene, or piperylene with an organolithium compound, with one of an iron compound, a nickel compound, and a cobalt compound.

Accordingly, it is an object of this invention to provide a new and improved polymerization process for conjugated dienes.

It is another object of this invention to provide a new and improved catalyst for polymerizing conjugated dienes.

It is another object of this invention to provide a new and improved process for making diolefins.

It is another object of this invention to provide a new and improved catalyst for forming diolefins.

Other aspects, objects, and the several advantages of this invention will be apparent to those skilled in the art from the description and the appended claims.

The organolithium compounds useful for forming the adduct component of the catalyst of this invention are represented by the formula $RLi_x$ wherein R is selected from the group consisting of saturated aliphatic, saturated cycloaliphatic, aromatic, and combinations of these radicals and has from 2 to 14, preferably 12, carbon atoms, inclusive, and wherein $x$ is a whole integer of 1, 2, or 3. Preferred organolithium compounds are lithium alkyl compounds having from 2 to 6 carbon atoms per molecule.

Representative examples of organolithium compounds that can be employed are: ethyllithium, n-butyllithium, isopentyllithium, n-octyllithium, isononyllithium, n-dodecyllithium, cyclohexyllithium, cycloheptyllithium, cyclodecyllithium, cyclododecyllithium, 1,2-dilithioethane, 1,4-dilithiobutane, 1,6-dilithiooctane, 1,5-dilithiodecane, 1,4-dilithiododecane, 1,2-dilithiocyclohexane, 1,4-dilithiocyclooctane, 1,5-dilithiocyclohendecane, 1,3,5-trilithiopentane, 2,4,6-trilithiononane, 1,3,5-trilithiocyclohexane, 1,3,5-trilithiocyclodecane, mono-, di-, and trilithiobenzene, mono-, di-, and trilithionaphthalene, dilithiostilbene (1,2-dilithio-1,2-diphenylethane), and the like.

The adduct is formed by reacting at least one of the above organolithium compounds with at least one of butadiene, isoprene, and piperylene, the organolithium compound thereby adding to the conjugated diene. For example, butyllithium can add to butadiene in a conventional 1,4 manner thereby adding a butyl radical to the 1 carbon atom of a butadiene molecule and adding a lithium atom to the 4 carbon atom of the butadiene molecule.

The formation of the adduct is carried out by contacting the organolithium compound(s) with the conjugated diene at a temperature generally in the range of from about —10 to about 80, preferably from about 0 to about 40° C. for a period of time sufficient to effect substantially complete formation of the desired adduct. The reaction can vary widely but will generally be from about 10 minutes to about 24 hours. The mole ratio of butadiene to molar equivalent of lithium employed will generally range from about 1/1 to about 25/1, although higher ratios can be employed if desired, the highest ratio employed being determined by economics rather than functionality. Generally, sufficient conjugated diene should be employed to insure complete reaction of the organolithium compound. The pressure employed in forming the adduct will be that sufficient to maintain the reactants substantially in the liquid phase. The pressure employed can be autogenous or higher if desired using conventional pressurizing materials such as nitrogen and the like.

The formation of the adduct can be carried out in the presence or absence of conventional, inert diluents. When diluents are employed, ethers, hydrocarbons and mixtures of two or more of each or both groups are preferred. The ethers employed generally should contain from 4 to 10 carbon atoms per molecule, inclusive, and can include ethyl ether, tert-butyl ether, propyl ether, pentyl ether, tetrahydrofuran, dioxane, and the like. When hydrocarbons are employed they can be selected from the group consisting of aliphatic, cycloaliphatic, aromatic, and combinations thereof having from 4 to 10 carbon atoms, inclusive. Examples of these include n-butane, n-pentane, isopentane, n-hexane, n-heptane, isooctane, n-dodecane, cyclohexane, methylcyclohexane, cyclooctane, benzene, toluene, xylene, Decalin, and the like.

The adduct is then combined with a cobalt compound or a nickel compound or an iron compound in the presence or absence of diluents, preferably in the presence of diluents. If diluents are employed they can be selected from the group of diluents discussed hereinabove with reference to the formation of the adduct component of the catalyst. Suitable nickel, iron, and cobalt compounds include the halides, salts of mono-, di-, and tribasic organic acids containing from 2 to 20 carbon atoms per molecule, and chelates of β-diketones of the formula

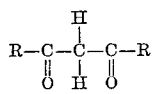

wherein R is at least one radical selected from the group consisting of saturated aliphatic, saturated cycloaliphatic, aromatic radicals, and combinations thereof and containing from 1 to 10 carbon atoms, inclusive.

Although for the sake of brevity, the following list of examples of compounds will be limited to cobalt, it is to be understood that for each cobalt compound listed the equivalent nickel or iron compounds can also be employed in this invention. Suitable compounds include cobalt chloride, cobalt bromide, cobalt iodide, cobalt acetate, cobalt propionate, cobalt benzoate, cobalt oxalate, cobalt phthalate, cobalt caproate, cobalt pelargonate, cobalt laurate, cobalt myristate, cobalt stearate, cobalt arachidate, and cobalt salts of 2,4-pentane dione (acetylacetone), 3,5 - heptanedione, 11,13 - tricosanedione, 1,3 - dicyclohexyl - 1,3 - propanedione, 1,5-dicyclopentyl - 2,4 - pentanedione, 1,3 - diphenyl - 1,3-propanedione, 1,5 - diphenyl - 2,4 - pentanedione, 2,8-dimethyl - 4,6 - nonanedione, 1,3 - di(4 - n - butylphenyl) - 1,3 - propanedione, 1,11 - diphenyl - 5,7-hendecanedione, 1 - phenyl - 1,3 - butanedione, 2,4-decanedione and 1 - (3,5 - dimethylcyclohexyl) - 2,4-pentanedione; and the like. In addition, when nickel compounds are employed the nickel salt of dimethylglyoxime (2,3 - butanedione dioxime) can be used.

Preferred compounds include nickelous chlorine, nickelous bromide, nickelous iodide, nickelous fluoride, nickelous acetate, nickelous benzoate, nickelous oxalate, nickelous stearate, ferrous chloride, ferric bromide, ferrous iodide, ferric acetate, ferric propionate, ferrous butyrate, ferric oxalate, ferrous oxalate, ferrous phthalate, ferric laurate, ferric stearate, cobaltous bromide, cobaltous iodide, cobaltic acetate, cobaltous propionate, cobaltous benzoate, cobaltic oxalate, cobaltous phthalate, cobaltous caproate, cobaltic pelargonate, cobaltous laurate, cobaltous myristate, cobaltous stearate, cobaltous arachidate. Other preferred compounds include cobaltic, cobaltous, nickelous, ferrous, and ferric salts of 2,4 - pentanedione (acetylacetone), 3,5 - heptanedione, 11,13 - tricosanedione, 1,3 - dicyclohexyl - 1,3-propanedione, 1,5 - dicyclopentyl - 2,4 - pentanedione, 1,3 - diphenyl - 1,3 - propanedione, 1,5 - diphenyl - 2,4-pentanedione, 2,8 - dimethyl - 4,6 - nonanedione, 1,3-di(4 - n - butylphenyl) - 1,3 - propanedione, 1,11 - diphenyl - 5,7 - hendecanedione, 1 - phenyl - 1,3 - butanedione, 2,4 - decanedione and 1 - (3,5 - dimethylcyclohexyl) - 2,4 - pentanedione; and the like.

The contact of the adduct with the cobalt or nickel or iron compound can be carried out at a temperature from about −80 to about 80, preferably from about 0 to about 25° C. The time for contacting will vary widely but will generally be from a few minutes, e.g. 3, to several hours, e.g. 3. The ratio of the adduct to the nickel or cobalt or iron compound will generally be in the range of from 2/1 to 6/1, preferably 2/1 to 9/1 for the iron compound, molar equivalents of lithium per mole of cobalt or nickel or iron. The organolithium compound should be present in an amount which is stoichiometrically sufficient to cause substantially complete reduction to zero valence of the cobalt or nickel or iron as the case may be. For example, the reduction of cobalt bromide would require 2 molar equivalents of lithium per mole of cobalt bromide, while the substantial reduction of cobalt acetylacetonate would require at least 6 molar equivalents of lithium per mole of cobalt acetylacetonate. In similar fashion, for complete reduction, nickel chloride requires about 2 molar equivalents, ferric chloride about 3 molar equivalents, and ferric acetylacetonate about 9 molar equivalents. The presence of lithium adduct in excess of that required to reduce the nickel or cobalt or iron to a zero valence state and to reduce any carbonyl groups present should be avoided in order to prevent excessive polymerization of the diene monomer to relatively heavy polymeric products.

The pressure employed in this step of the catalyst formation will generally be that sufficient to maintain the reactants substantially in a liquid state and can be autogenous or higher if desired.

The dimerization of butadiene to a linear oligomer using the cobalt catalyst of this invention can be carried out at temperatures in the range of from about 10 to about 200, preferably from about 20 to about 150° C. for a period of time sufficient to effect the desired dimerization. Generally the time for reaction can vary widely but will be from about 10 minutes to about 100 hours. The dimerization is carried out under a pressure sufficient to keep the reactants substantially liquid which can be autogenous or higher if desired. The dimerization can be carried out in the absence or presence of a diluent, preferably in the presence of at least one diluent described hereinabove with reference to the formation of the adduct. The amount of catalyst employed will be that which provides from 0.1 to 10 atoms of cobalt per 1000 moles of conjugated diene.

The product of this dimerization process, when butadiene is the feed, comprises oligomers and is composed primarily of 3-methyl-1,4,6-heptatriene which can be recovered by conventional methods such as fractional distillation, crystallization, solvent extraction, chromatographic techniques and the like. It is sometimes convenient to contact the reaction mass with aqueous mineral acid to destroy the catalyst and separate the catalyst components from the oligomer-containing organic phase.

The trimerization of butadiene, isoprene, or piperylene with a nickel catalyst of this invention to form cyclic oligomers and the polymerization of those conjugated dienes with the iron catalyst of this invention can both be carried out at a temperature in the range of from about 80 to about 200, preferably from about 100 to about 150° C. for a period of time sufficient to effect the desired trimerization. Generally, the time for reaction will be from about 10 minutes to about 24 hours. The trimerization can be carried out in the absence or presence of a diluent, preferably in the presence of at least one diluent described hereinabove with reference to the formation of the adduct component of the catalyst. The pressures employed during this reaction should be that sufficient to maintain the reactants substantially in the liquid phase and can be autogenous or higher if desired. The amount of catalyst employed in the trimerization reaction will be that which provides from about 0.1 to about 10 atoms of nickel per 1000 moles of conjugated diene.

The product of this trimerization reaction comprises oligomers and is composed primarily of cyclododecatrienes which can be recovered such as fractional distillation, crystallization, solvent extraction, chromatographic techniques and the like.

The conversion of conjugated dienes together with ethylene to diolefins using the iron, nickel or cobalt contaning catalysts of this invention can be carried out at temperatures in the range of from about 0 to about 100, preferably from about 25 to about 60° C. for a period of time to effect the desired reaction. The time can vary widely but will generally be in the range of from about 10 minutes to about 100 hours. The reaction is carried out under a pressure sufficient to keep the reactants substantially in the liquid state which can be autogenous and can vary up to about 1000 p.s.i.g. or higher. The pressure of the reaction can be adjusted by the ethylene comonomer. Sufficient ethylene should be present in the reaction zone to provide at least a 1 to 1 mole ratio of ethylene to butadiene, with an excess of ethylene presently being preferred. The reaction can be carried out in the presence or absence of a diluent, preferably in the presence of at least one diluent described with reference to the formation of the catalyst. The amount of catalyst employed will vary widely but will generally range from about 0.1 to about 10 atoms of iron per 1000 moles of conjugated diene present.

The linear diolefin product, when 1,3-butadiene and ethylene are reacted over the iron-containing catalyst of this invention, is principally 1,4-cis-hexadiene with some 2,4-hexadiene being present. The products of this aspect of the invention can be recovered by conventional methods such as distillation, crystallization, solvent extraction, adsorption techniques, and the like. It can be convenient to contact the reaction mass with aqueous mineral acid to destroy the residual catalyst and separate the catalyst components from the product-containing organic phase.

Example I

A catalyst was prepared by reacting 0.02 mole of n-butyllithium with 15 grams (0.28 mole) of butadiene in 50 milliliters of cyclohexane. After 30 minues at 25° C. the reaction mixture was added to a suspension of 1.28 grams (0.005 mole) of cobalt acetylacetonate in 25 milliliters of cyclohexane which was cooled in an ice bath.

After 30 minutes, the above-prepared catalyst was then charged to a 1-liter autoclave along with 123 grams (2.28 moles) of butadiene. The autoclave was heated to 60° C. at which temperature the pressure was 90 p.s.i.g. After 2 hours and 25 minutes the pressure had dropped to 25 p.s.i.g. and at this time the autoclave heaters were turned off. The unreacted butadiene was vented from the autoclave and the liquid reaction mixture in the autoclave was contacted with a 5 weight percent aqueous solution of hydrochloric acid. The organic phase was then separated and distilled to produce 62.1 grams of material boiling from 50 to 73° C. at 125 millimeters mercury absolute pressure which material was identified by gas liquid chromatography to be essentially 3-methyl-1,4,6-heptatriene. The distillation also yielded 32.6 grams of material boiling from 75° C. at 50 millimeters mercury absolute pressure to 86° C. at 3 millimeters mercury absolute pressure. This material was determined by gas-liquid chromatographic techniques to consist predominantly of linear butadiene trimers. The residue from the distillation amounted to 5.2 grams.

An ultimate yield of 60 percent at a conversion of 85 percent of 3-methyl-1,4,6-heptatriene was obtained by the practice of this invention in this example.

Example II

A mixture of 1.29 grams (0.02 mole) of n-butyllithium (used as a 15 percent by weight solution in n-hexane) and 50 milliliters of n-pentane was cooled in an ice bath and contacted with 15 grams (0.28 mole) of butadiene. Over a 30 minute period of time, the mixture was allowed to warm to 25° C. at which time the mixture was added to 1.28 grams (0.005 mole) of cobalt acetylacetonate in 25 milliliters of n-pentane which had been cooled in an ice bath. The resulting brown reaction mixture was then allowed to warm to 25° C. The mixture was then contacted with 207 grams (3.83 mols) of butadiene and the reaction mixture was allowed to stand at room temperature for 20 hours. The unreacted butadiene was then vented and the amount of butadiene vented was 71 grams.

The remaining liquid material was contacted with a 5 weight percent aqueous solution of hydrochloric acid after which the organic phase was separated and distilled. The distillation yielded 77.1 grams of material boiling from 61 to 75° C. at 125 millimeters mercury absolute pressure which was identified by gas-liquid chromatographic techniques to consist essentially of 3-methyl-1,4,6-heptatriene.

This example of the invention gave an ultimate yield of 3-methyl-1,4,5-heptatriene of 79.7 percent at 47 percent conversion.

Example III

A catalyst was prepared by mixing 0.02 mole of n-butyllithium with 14 grams of butadiene in pentane at about 0° C. The mixture was allowed to warm to room temperature over a period of 30 minutes. To this mixture was then added 5 millimoles of cobalt acetylacetonate and the mixture was then cooled in an ice bath for 1 hour.

The resulting catalyst was then admixed with 287 grams of butadiene and maintained in an ice bath for 6 hours. The mixture was then allowed to warm to 25° C. and maintained at this temperature for 60 hours. The reactor was then vented releasing 68 grams of butadiene and the remaining liquid was hydrolyzed with a 5 weight percent aqueous solution of hydrochloric acid. The organic layer was separated and distilled to yield 120.8 grams of material. This material was characterized as consisting essentially of 3-methyl-1,4,6-heptatriene by gas-liquid chromatographic techniques.

This example gave an 86 percent ultimate yield of 3-methyl-1,4,6-heptatriene at the conversion of 49 percent.

A comparative run carried out by a process other than the process of this invention was made in which 1.29 grams of cobalt acetylacetonate and 144 grams of butadiene were charged to a 1-liter autoclave and cooled to Dry Ice temperature (−78° C.). At this time, 14 milliliters of a 1.6 molar solution of triethylaluminum and cyclohexane was charged to the autoclave. The autoclave was then heated to a temperature of 0° C. at which temperature the pressure was 0 p.s.i.g. The autoclave was then heated to a temperature of from 60 to 65° C. and maintained in that temperature range for 5 hours and 20 minutes during which time the pressure dropped from a maximum of 120 p.s.i.g. to 60 p.s.i.g. The autoclave was then vented and the liquid material remaining distilled after hydrolysis with a 5 weight percent aqueous solution of hydrochloric acid. The distillation yielded 48.3 grams of 3-methyl-1,4,6-heptatriene as determined by gas-liquid chromatographic techniques.

This comparative example gave a 42 percent ultimate yield at 79 percent conversion which is substantially less than Example I which was also carried out at 60° C. but which employed the catalyst of this invention and thereby realized a 60 percent ultimate yield at an 85 percent conversion. Thus, the use of the conjugated diene-organolithium adduct in the catalyst of this invention effects a surprising improvement in not only the ultimate yield but also the conversion of butadiene to 3-methyl-1,4,6-heptatriene in a shorter reaction time.

Another comparative run was carried out using 1.71 grams of dicobalt octacarbonyl in 163 grams of butadiene which were charged to a 1-liter autoclave and then cooled in an ice bath. Thereafter 94 milliliters of a 1.6 molar solution of triethylaluminum in cyclohexane and an additional 120 grams of butadiene were charged to the reactor. The reactor was then heated to 40° C. at which time the pressure reached 50 p.s.i.g. The reactor was maintained at 40 to 42° C. for 24 hours, during which time there was no substantial pressure drop.

The reactor was vented and the liquid material remaining distilled after hydrolysis with a 5 weight percent aqueous solution of hydrochloric acid. The distillate yielded 43.4 grams of 3-methyl-1,4,6-heptatriene and 45 grams of higher boiling trienes and other oligomers, as identified by gas-liquid chromatographic techniques.

This comparative example gave an ultimate yield of 3-methyl-1,4,6-heptatriene of 50 weight percent at 31 percent conversion. This is to be compared with Examples II and III which also employed temperatures lower than 60° C. but obtained ultimate yields of 79.7 percent at 47 percent conversion and 86 percent at 49 percent conversion, respectively.

Example IV

A 7-ounce bottle was charged with about 16 milliliters of n-hexane solution containing 1.6 grams of n-butyllithium and 50 milliliters of ethyl ether. This solution was then cooled in an ice bath and charged with butadiene until 10 grams was absorbed. The resulting mixture was then allowed to warm to room temperature (about 25° C.).

Another 7-ounce bottle was charged with 1.8 grams of nickel acetylacetonate in 25 milliliters of ethyl ether. After cooling in an ice bath, the butyllithium solution prepared in the prior paragraph was added. The resulting mixture was stirred with continued cooling in the ice bath for 1 hour and then allowed to warm to room temperature, for approximately 2 hours.

At the end of the 2 hours warming period a 1-liter autoclave was flushed with nitrogen and charged with the above-prepared catalyst together with 120 grams of butadiene. The autoclave was then heated to 150° C. at which time the autoclave heaters were turned off. At this time the pressure in the autoclave was 160 p.s.i.g. and after 1 hour and 22 minutes the temperature had fallen to 98° C. and the pressure had dropped to 70 p.s.i. The reaction mixture was hydrolyzed with a 10 weight percent solution of hydrochloric acid after which the organic layer was separated, dried over calcium sulfate and stripped to remove lower boiling materials. The stripped material was then distilled yielding 91.8 grams of material boiling from 33° C. at 10 millimeters mercury to 110° C. at 3 millimeters mercury absolute pressure. Analysis of this material by gas-liquid chromatographic techniques indicated the presence of 6.4 grams of 4-vinylcyclohexene, 3 grams of 1,5-cyclooctadiene, 79.1 grams of 1,5,9-cyclododecatriene and 3.2 grams of an unidentified material. The amount of residue from this distillation was 26.7 grams. This example gave an ultimate yield of cyclododecatriene of 72.8 percent at 90 percent conversion.

Example V

In this run 0.02 mole of n-butyllithium, 50 milliliters of cyclohexane and 13 grams of butadiene were mixed and allowed to stand 4 hours at room temperature (about 25° C.). The mixture was then added to a cold (about 0° C.) suspension of 1.28 grams of nickel acetylacetonate in 25 milliliters of cyclohexane. After 1.5 hours in an ice bath, this resulting mixture was contacted with 330 grams butadiene in the following manner.

A 1-liter autoclave was flushed with nitrogen and charged with the above-prepared catalyst and then 330 grams of butadiene. The autoclave was then heated to 120° C. and maintained at this temperature for 1 hour and 20 minutes during which time the pressure fell from a maximum 250 p.s.i.g. to 60 p.s.i.g.

The autoclave was vented and the liquid material remaining was hydrolyzed with a 10 weight percent aqueous solution of hydrochloric acid. The organic phase was then separated and distilled yielding 311.7 grams of material boiling from 60° C. at 100 millimeters mercury absolute pressure to 120° C. at 3 millimeters mercury absolute pressure. Gas-liquid chromatographic analysis of this material indicated the presence of 18.7 grams of 4-vinylcyclohexene, 14.0 grams of 1,5-cyclooctadiene, and 279 grams of 1,5,9-cyclododecatriene. The amount of residue in this run was 16.6 grams.

This example gave a cyclododecatriene ultimate yield of 89 percent at 95 percent conversion. Thus, it can be seen that when in this example the butadiene and butyllithium were contacted for a longer period of time prior to addition of a nickel compound a more active catalyst is formed as can be seen by comparing the ultimate yield of 72.8 percent at 90 percent conversion for Example IV and the 89 percent ultimate yield at 95 percent conversion of this example.

In all the above examples, the ultimate yield was determined by dividing the weight of desired dimer or trimer produced by the weight of butadiene consumed.

Example VI

Butadiene and ethylene were converted to 1,4-hexadiene and 2,4-hexadiene over a catalyst prepared from the adduct of butyllithium and butadiene, and ferric acetylacetonate.

A 1.96 gram quantity of butyllithium, as a 14 weight percent solution in heptane, was diluted with 50 milliliters of n-pentane, cooled in an ice bath, and treated with 14 grams of butadiene. This mixture was allowed to warm to room temperature, and after 30 minutes, was added to a suspension of 1.77 grams of ferric acetylacetonate in 25 milliliters of n-pentane which had been cooled in an ice bath. This mixture was allowed to warm to room temperature before use.

The butadiene-ethylene conversion was carried out in an autoclave which was flushed with nitrogen, charged with the above-prepared catalyst, charged with 185 grams of butadiene, and then pressured with ethylene to 450 p.s.i.g. which was maintained with stirring throughout the reaction. The reaction was continued for 6 hours with stirring at a temperature of about 25° C.

After the reaction period, the reaction mixture was hydrolyzed with 5 weight percent aqueous hydrochloric acid, the organic phase separated, and the products identified by distillation, index of refraction, and gas-liquid chromatography. It was found that 98.6 grams of hexadienes were produced from the run amounting to a 35-percent yield based on butadiene. Of these hexadienes, 63.6 grams was cis-1,4-hexadiene while 35 grams was 2,4-hexadiene.

Example VII

In this example, the catalyst prepared from ferric chloride and the adduct of n-butyllithium and butadiene was used to convert butadiene and ethylene to linear dienes.

The catalyst was prepared by charging a reactor with 7 grams of a 14 weight percent n-butyllithium in hexene solution together with 25 milliliters of n-pentane. This mixture was cooled in an ice bath, and then mixed with 10 grams of butadiene. The mixture was allowed to stand overnight at room temperature. A solution of 0.81 gram of ferric chloride in 50 milliliters of ethyl ether was cooled in a Dry Ice acetone bath and treated with the above-prepared adduct. After one hour the cold, brown solution was transferred to an autoclave. The autoclave was then charged with 160 grams of butadiene and pressured to 100 p.s.i.g. (at −15° C.) with ethylene.

The reaction was allowed to continue for about 3 hours at 40 to 65° C. and 100 to 275 p.s.i.g. At the completion of the reaction, the reaction mixture was hydrolyzed with 5 weight percent hydrochloric acid and the organic phase was analyzed by gas-liquid chromatography. The analysis showed the presence of 65.4 grams of cis-1,4-hexadiene and 1.9 grams of 2,4-hexadiene for a total hexadiene yield of 23 percent.

Reasonable variations and modifications are possible within the scope of this disclosure without departing from the spirit and scope thereof.

I claim:

1. A method of oligomerizing a conjugated diene selected from the group consisting of butadiene, isoprene, and piperylene comprising contacting at least one of said conjugated dienes under oligomerization conditions with a catalyst consisting essentially of that formed on mixing an adduct formed from a conjugated diene selected from the group consisting of butadiene, isoprene and piperylene and an organolithium compound of the formula $RLi_x$ wherein R is a radical selected from the group consisting of saturated aliphatic, saturated cycloaliphatic, aromatic, and combinations thereof having from 2 to 12 carbon atoms, inclusive, and $x$ is a whole integer selected from the group 1, 2, and 3, a compound selected from the group consisting of nickel halides, nickel salts of mono-, di-, and tribasic organic acids containing from 2 to 20 carbon atoms per molecule, nickel chelates of beta-diketones of the formula

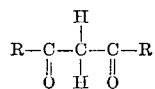

wherein R is a radical selected from the group consisting of saturated aliphatic, saturated cycloaliphatic, aromatic, and combinations thereof containing from 1 to 10 carbon atoms, inclusive, and nickel salts of dimethylglyoxime.

2. The method according to claim 1 wherein one of butadiene, isoprene, and piperylene are oligomerized employing an adduct formed by contacting butadiene and said organolithium at a temperature in the range of from about −10 to about 80° C., using a ratio of moles of butadiene to molar equivalents of lithium in the range of 1/1 to 25/1, and wherein the adduct is contacted with the nickel compound at a temperature in the range of from about −80 to about 80° C. using from 2/1 to 6/1 molar equivalents of lithium per mole of nickel, the oligomerization is carried out at a temperature in the range of from about 80 to about 200° C.

3. The method according to claim 1 wherein butadiene is oligomerized with a catalyst consisting essentially of that formed on mixing butadiene-butyllithium adduct with nickel acetylacetonate.

References Cited

UNITED STATES PATENTS

| | | | |
|---|---|---|---|
| 3,219,716 | 11/1965 | Wittenberg et al. | 260—666 |
| 3,249,641 | 5/1966 | Storrs et al. | 260—666 |

FOREIGN PATENTS

| | | |
|---|---|---|
| 618,625 | 6/1962 | Belgium. |
| 1,329,122 | 4/1963 | France. |

DELBERT E. GANTZ, *Primary Examiner.*

V. O'KEEFE, *Assistant Examiner.*